United States Patent
De Bruijn et al.

(10) Patent No.: US 10,440,496 B2
(45) Date of Patent: Oct. 8, 2019

(54) SPATIAL AUDIO PROCESSING EMPHASIZING SOUND SOURCES CLOSE TO A FOCAL DISTANCE

(71) Applicant: KONINKLIJKE PHILIPS N.V., Eindhoven (NL)

(72) Inventors: Werner Paulus Josephus De Bruijn, Utrecht (NL); Leon Maria Van De Kerkhof, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/092,958

(22) PCT Filed: Apr. 6, 2017

(86) PCT No.: PCT/EP2017/058172
§ 371 (c)(1),
(2) Date: Oct. 11, 2018

(87) PCT Pub. No.: WO2017/178309
PCT Pub. Date: Oct. 19, 2017

(65) Prior Publication Data
US 2019/0174246 A1 Jun. 6, 2019

(30) Foreign Application Priority Data
Apr. 12, 2016 (EP) ..................... 16164787

(51) Int. Cl.
*H04S 7/00* (2006.01)
*G06F 3/01* (2006.01)
(Continued)

(52) U.S. Cl.
CPC .............. *H04S 7/303* (2013.01); *G06F 3/012* (2013.01); *G06F 3/013* (2013.01); *H04R 3/12* (2013.01);
(Continued)

(58) Field of Classification Search
CPC ...... H04S 7/303; H04S 2400/11; G06F 3/012; G06F 3/013; H04R 3/12; H04R 5/04
See application file for complete search history.

(56) References Cited

U.S. PATENT DOCUMENTS

| | | |
|---|---|---|
| 2010/0040238 A1 | 2/2010 | Jang et al. |
| 2015/0055808 A1 | 2/2015 | Vennstrom et al. |

FOREIGN PATENT DOCUMENTS

| | | |
|---|---|---|
| EP | 1227392 A2 | 7/2002 |
| WO | 2009056956 A1 | 5/2009 |

OTHER PUBLICATIONS

Kleiner, M. "Acoustics and Audio Technology (Acoustics: Information and Communication)", J. Ross Publishing, 2011.
(Continued)

*Primary Examiner* — Regina N Holder

(57) ABSTRACT

A spatial audio processing apparatus comprises a receiver (101) for receiving audio scene data describing an audio scene comprising spatial audio components and associated position data. The audio components may be provided as audio objects. A distance unit (105) provides a position indication which includes a focus distance that is indicative of a distance from a reference position in the audio scene. An adapter (103) adapts a perceptual emphasis property, such as an audio level, frequency distribution, or degree of diffuseness, of a spatial audio component relative to at least one other spatial audio component of the audio scene in response to a difference measure reflecting a difference between the focus distance and a distance in the audio scene from the reference position to a position of the spatial audio component. An audio renderer (107) renders the resulting audio scene using the received position data. The approach may emphasize audio at the focus distance in the audio scene.

15 Claims, 2 Drawing Sheets

(51) Int. Cl.
H04R 5/04 (2006.01)
H04R 3/12 (2006.01)
(52) U.S. Cl.
CPC ............ *H04R 5/04* (2013.01); *H04S 2400/11* (2013.01); *H04S 2420/01* (2013.01)

(56) References Cited

OTHER PUBLICATIONS

Pulkki, V. et al, "Communication Acoustics: An Introduction to Speech, Audio and Psychoacoustics", Wiley Publishing, 2015.
"Dolby Atmos Specifications", Dolby, Issue 3, 2015.
"Facebook's 360-degree videos bring immersive content to your News Feed", 2015, https://www.engadget.com/2015/09/23/facebook-360-video-news-feed/.
"Panoramic UHD Video", Fraunhofer Institute for Telecommunications, Heinrich Hertz Institute, HHI, 2018.
"Light-field camera", From Wikipedia, the free encyclopedia, https://en.wikipedia.org/wiki/Light-field_camera, accessed Oct. 2018.
"Lytro", From Wikipedia, the free encyclopedia, https://en.wikipedia.org/wiki/Lytro, accessed Oct. 2018.
"Immerge is a ball of Lytro cameras for VR video", Engadget, https://www.engadgetcom/2015/11/05/lytro-immerge/, 2015.
Eigenmike microphone, MH Acoustics, https://mhacoustics.com/products, accessed 2018.

SPATIAL AUDIO PROCESSING EMPHASIZING SOUND SOURCES CLOSE TO A FOCAL DISTANCE

CROSS-REFERENCE TO PRIOR APPLICATIONS

This application is the U.S. National Phase application under 35 U.S.C. § 371 of International Application No. PCT/EP2017/058172, filed on 6 Apr. 2017, which claims the benefit of European Patent Application No. 16164787.0, filed on 12 Apr. 2016. These applications are hereby incorporated by reference herein.

FIELD OF THE INVENTION

The invention relates to spatial audio processing and in particular, but not exclusively, to spatial audio processing for virtual reality applications.

BACKGROUND OF THE INVENTION

Spatial audio applications have become numerous and widespread and increasingly form at least part of many audiovisual experiences. Indeed, new and improved spatial experiences and applications are continuously being developed which results in increased demands on the audio processing and rendering.

For example, in recent years, Virtual Reality (VR) and Augmented Reality (AR) have received increasing interest and a number of implementations and applications are reaching the consumer market. Indeed, equipment is being developed for both rendering the experience as well as for capturing or recording suitable data for such applications. For example, relatively low cost equipment is being developed for allowing gaming consoles to provide a full VR experience. It is expected that this trend will continue and indeed will increase in speed with the market for VR and AR reaching a substantial size within a short time scale.

The concept of Virtual Reality or Augmented Reality encompasses a very wide field of concepts. It may include fully immersive scenarios where the user navigates in a 3D virtual world as he would in real-life (e.g. looking around by physically moving his head, or even physically walking around), or may e.g. include simpler scenarios where navigation in the virtual world is done by means of explicit controls.

However, most of the effort so far has concentrated on the visual side of the provided experience, i.e. it has concentrated on developing approaches for capturing and rendering three dimensional adaptive visual experiences.

For example, various systems for 360-degree (2D and 3D) video capturing have recently been developed. A particularly interesting VR video capturing technology is the so-called "light field camera" (also known as "plenoptic" camera). Such cameras do not simply capture the light intensity of a scene in an image, but also capture the direction from which light reaches the camera. This allows various types of post-processing of the recorded image. In particular, it allows the focal plane of the image to be changed after the image has been recorded. In practical terms, this means that it is possible to change the in-focus distance (relative to the camera standpoint) at the time of rendering the image.

It has been proposed to provide a spherical camera system for VR applications, consisting of multiple light field cameras in a spherical arrangement. Such a camera system enables capturing of 360-degree 3D panorama recordings while making it possible to change the focal distance and/or zoom in post-processing.

Such developments on the video side opens up a range of possibilities for generating immersive and interactive visual content and experiences. However, in general, less interest has been focused on providing improved and more suitable spatial audio experiences. Indeed, typically the audio solutions are less adaptive and tend to mainly use a conventional spatial audio experience where the only adaptability may be that the position of some audio sources can be changed.

Hence, an improved spatial audio system would be advantageous and in particular an audio processing approach allowing increased flexibility, improved adaptability, an improved virtual reality experience, improved performance, increased user control or adaptation, user side manipulation, and/or an improved spatial audio experience would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a spatial audio processing apparatus comprising: a receiver (101) for receiving audio scene data describing an audio scene, the audio scene data comprising audio data describing spatial audio components and position data describing positions in the audio scene for at least some of the spatial audio components; a distance unit (105) for providing a variable focus distance being indicative of a distance from a reference position in the audio scene; an adapter (103) for adapting a perceptual emphasis property of at least a first spatial audio component of the spatial audio components relative to at least one other spatial audio component of the audio scene in response to a difference measure reflecting a difference between the variable focus distance and a distance in the audio scene from the reference position to a position of the first spatial audio component; an audio renderer for rendering the spatial audio components, the rendering being in response to the position data and the rendering of the first spatial audio component being subsequent to the adaptor adapting the perceptual emphasis property.

The approach may provide an improved spatial audio experience in many embodiments. In particular, the approach may e.g. provide an improved virtual reality experience, and may e.g. allow a closer correlation between a visual and audio perception. In many embodiments, the approach may provide an improved user focus while maintaining a consistent spatial experience. For example, in a virtual reality environment, the approach may allow an improved user focusing that adapts to changes in the user characteristics (e.g. head or eye movement) while maintaining a constant and consistent virtual reality environment, i.e. without audio sources moving relative to each other as a function of a changed focus.

The approach may provide improved user side/rendering time adaptation of the rendered audio stage. It may provide increased user control of the provided audio experience. In particular, it may allow a render side emphasizing of particular audio sources relative to other audio sources.

The approach may provide an audio signal/audio data suitable for spatial rendering with an improved spatial consistency yet adapted to the current listening characteristics or preferences. In particular, it may in many embodiments allow an emphasis of audio sources corresponding to a current focus of the user.

The improvement may typically be achieved with relatively low complexity and the approach may in many scenarios allow a relatively low cost implementation.

The reference position may specifically be a listener or listening position in the audio scene (specifically may be a virtual position representing the position of a listener in a virtual audio scene).

The focus distance is variable with respect to the reference point. The adapter may be arranged to vary the perceptual emphasis property for the first spatial audio component in response to variations to the variable focus distance.

The reference postion may be a variable position in the audio scene. The variable focus distance may be independent of the reference position. In many embodiments, the control of the variable focus distance may be independent of the control of the reference position. Specifically the variable focus distance may be varied for a fixed/unchanged reference position. The adapter may be arranged to vary the adaptation in response to variations in the focus distance for a constant reference position.

In addition to the audio data describing specific audio sources, the audio data may comprise data representing non-point sources or indeed non-localized (or even non-spatial) audio sources. For example, audio data may be included which describes a distributed ambient background sound or noise. In some embodiments, at least some of the audio components may be point sources.

In some embodiments, separate audio data may be provided for each or at least some of the spatial audio components, i.e. an audio component may be described by audio data providing information only relating to the audio component. In some embodiments, each spatial audio component may be represented by a separate, complete, and individual set of audio data. Each audio component may e.g. be represented as a separate audio object and may correspond to a single audio source.

In some embodiments, the audio data may describe one or more audio signals from which the individual spatial audio source can be extracted. For example, the audio data may represent/describe a plurality of spatial audio channels, e.g. corresponding to predetermined positions, and the individual audio components can be extracted from the audio channel data (e.g. using Principal Component Analysis). As another example, the audio could be represented in accordance with the audio format known as 'Spatial Audio Object Coding" standardized by MPEG.

The position data may represent the spatial positions of the spatial audio components. The position data for a spatial audio component may indicate a position in the audio scene for an audio source represented by the spatial audio component. The position may be a recommended position which may possibly be changed (e.g. in response to a user input) by the renderer.

In many embodiments, the renderer may determine a render position for the first spatial audio component independently of the variable focus distance. The renderer may render the first audio component at a position which is independent of the variable focus distance. In many scenarios, the renderer may render the first audio component at a position corresponding to the position in the audio scene indicated by position data for the first spatial audio component.

The audio scene may be represented by spatial and non-spatial audio components. The spatial audio components may represent spatial audio sources that specifically may be point sources.

The variable focus distance may e.g. be obtained from a manual user input or may e.g. be automatically determined based on analyzing user behavior. The variable focus distance may be indicative of a distance from a reference position in the audio scene to a (target) focus, such as specifically to a point, plane or distance in the audio scene at which the user is (assumed/estimated to be) focusing on. However, it will be appreciated that the approach does not require that a listener actually does continuously focus on this distance. Rather, the term variable focus distance refers to a distance which the spatial audio processing apparatus uses as a reference for the adaptation (the term "focus" may be considered as merely a label). The spatial audio processing apparatus may adapt the audio components such that audio components closer to the variable focus distance are emphasized thereby typically providing an increased user focus.

The perceptual emphasis property may be any property of an audio component and specifically may reflect the perceived emphasis of the audio component in the audio scene. The perceptual emphasis property may specifically be at least one of an audio level property, a frequency distribution property, and a diffuseness property.

In some embodiments, the perceptual emphasis property is an audio level for the first spatial audio component.

This may provide a particularly advantageous user experience in many embodiments. It may in particular provide an improved audio user experience which may e.g. closely match a visual experience, for example allowing both the visual and audio rendering to adapt the emphasis on the same aspects of e.g. a virtual reality scene and further allowing these to vary dynamically. The approach may allow improved and/or emphasized perception of specific audio sources, such as those that are currently of most interest to the user.

The audio level variation depending on the difference measure may typically be an amplitude variation of no more than 10 dB, and often no more than 6 dB.

The adapter may generate an adapted perceptual emphasis property for the first spatial audio component by adapting the perceptual emphasis property. The audio renderer may be arranged to render the first spatial audio component in response to the adapted perceptual emphasis property.

In accordance with an optional feature of the invention, the adapter is arranged to determine a value of the perceptual emphasis property as a continuous function of a difference between the variable focus distance and the distance in the audio scene from the reference position to the position of the first spatial audio component.

The function may be a gradual function and thus the value of the perceptual emphasis property, e.g. a gain or audio level, may be gradually changed for gradual changes in the difference between the focus distance and the distance to the given audio component. This may provide an advantageous effect which is perceived to be a more natural audio experience, especially when the focus is dynamically varied for a given unchanged reference/listening position. In accordance with an optional feature of the invention, the adapter is arranged to increase a gain for the first spatial audio component relative to the at least one other spatial audio component for the difference measure being indicative of a decreasing difference.

This may provide a particularly advantageous operation in many embodiments. It may allow relatively low complexity yet provide high performance. The gain variation may in many embodiments be no more than 10 dB, and often no more than 6 dB.

The gain for audio components may be a monotonically decreasing function of the difference measure.

In accordance with an optional feature of the invention, the gain is determined as a function of the difference measure, the function being asymmetric with respect to distances from the reference position to the position of the first audio component component being smaller than the variable focus distance and to distances from the reference position to the position of the first spatial audio component being larger than the variable focus distance.

This may provide an improved user experience in many embodiments.

In accordance with an optional feature of the invention, the perceptual emphasis property is a frequency signal distribution for the first spatial audio component.

This may provide a particularly advantageous user experience in many embodiments. It may in particular provide an improved audio user experience which may e.g. closely match a visual experience, for example allowing both the visual and audio rendering to adapt the emphasis on the same aspects of e.g. a virtual reality scene and further allowing these to vary dynamically. The approach may allow improved and/or emphasized perception of specific audio sources, such as those that are currently of most interest to the user.

In many embodiments, the adapter may be arranged to increasingly bias the signal distribution from lower frequencies towards higher frequencies for a decreasing difference measure. The adapter may be arranged to increase the high frequency signal energy relative to the low frequency signal energy for a decreasing difference measure.

In accordance with an optional feature of the invention, the adapter is arranged to vary a frequency dependent filtering of the at least one other spatial audio component in response to the difference measure.

This may provide an efficient implementation and/or may provide improved performance. The adapter may provide a frequency equalization or filtering which is dependent on the difference measure.

In accordance with an optional feature of the invention, the perceptual emphasis property is a diffuseness property for the first spatial audio component.

This may provide a particularly advantageous user experience in many embodiments. It may in particular provide an improved audio user experience which may e.g. closely match a visual experience, for example allowing both the visual and audio rendering to adapt the emphasis on the same aspects of e.g. a virtual reality scene and further allowing these to vary dynamically. The approach may allow improved and/or emphasized perception of specific audio sources, such as those that are currently of most interest to the user.

In accordance with an optional feature of the invention, the adapter is arranged to decrease a degree of diffuseness for the first spatial audio component relative to the at least one other spatial audio component of the audio scene for the difference measure being indicative of a decreasing difference.

This may in many applications provide an improved user experience. In particular, it may in many applications allow audio of currently specific interest to the user to be perceived as more specific and well defined audio sources, and may e.g. allow these to stand out more in the sound stage being perceived.

In accordance with an optional feature of the invention, the difference measure is further dependent on a direction from the reference to the position of the first spatial audio component.

This may provide an improved user experience in many embodiments.

In accordance with an optional feature of the invention, the audio scene data comprises audio objects representing at least some of the spatial audio components.

The approach may allow a particularly efficient operation for audio objects resulting in an improved effect and thus improved user experience.

The audio scene data may further comprise position data, e.g. as meta-data, indicating positions of the audio objects in the audio scene.

In accordance with an optional feature of the invention, the distance unit is arranged to determine the variable focus distance in response to at least one of a listener head and eye tracking.

The approach may for example allow automated adaptation to the user movements thereby e.g. allowing a consistent and immerging virtual reality user experience. It may allow a strong coherence between the visual and audio experience provided to a user.

In accordance with an optional feature of the invention, the adapter is arranged to adapt the perceptual emphasis property without changing an Interaural Time Difference for the first spatial audio component.

This may substantially improve the user experience in many embodiments and may e.g. allow the relative emphasis of sound sources in an audio scene to be dynamically adapted to the user's current preferences while maintaining the perceived positions of the sound sources.

In accordance with an optional feature of the invention, adapter is arranged to adapt the perceptual emphasis property to reduce an emphasis of the first audio component for an increasing difference measure where the variable focus distance is larger than the distance from the reference position to the position of the first spatial audio component.

This may provide an advantageous effect and indeed may allow increased focus on different areas in the audio scene including in particular more distant audio components.

In many embodiments, the renderer is arranged to render at least the first spatial audio components at a position indicated by position data for the first spatial audio component.

This may provide an attractive use scenario in many embodiments and may in particular allow dynamic adaptation of the emphasis on different objects in the scene without changing the spatial properties of the generated audio scene.

A virtual reality system comprising an audio processing apparatus as described may be provided.

The approach may provide an improved virtual reality experience,

The virtual reality system may further comprise a video renderer for rendering a virtual (e.g. three dimensional) visual scene matching the audio scene.

According to an aspect of the invention, there is provided method of spatial audio processing comprising: receiving audio scene data describing an audio scene, the audio scene data comprising audio data describing spatial audio components and position data describing positions in the audio scene for at least some of the spatial audio component; providing a variable focus distance being indicative of a distance from a reference position in the audio scene; adapting a perceptual emphasis property of at least a first spatial audio component of the spatial audio components relative to at least one other spatial audio component of the audio scene in response to a difference measure reflecting a difference between the variable focus distance and a distance in the audio scene from the reference position to a position of the first spatial audio component; and subsequent to the adapting of the perceptual emphasis property, rendering the spatial audio components including the first spatial audio component, the rendering being in response to the position data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an adaptive audiovisual rendering system, and in particular to a virtual reality system for providing a virtual reality experience to a user. However, it will be appreciated that the invention is not limited to this application but may be applied to many other spatial audio processes and applications.

Figure 1:
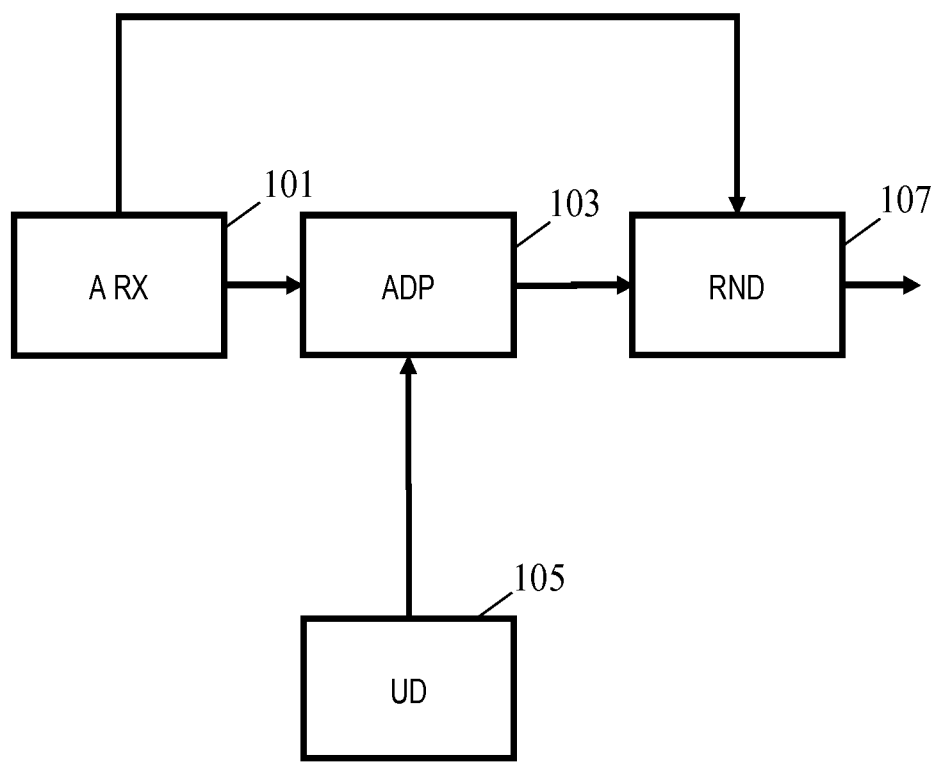
FIG. 1 illustrates some elements of a spatial audio processing apparatus in accordance with some embodiments of the invention.

FIG. 1 illustrates some elements of a spatial audio processing apparatus in accordance with some embodiments of the invention.

The spatial audio processing apparatus comprises an audio receiver 101 which is arranged to receive audio scene data that describes an audio scene comprising spatial audio components associated with spatial positions. The audio scene data comprises audio data which describes a number of audio components. Each audio component may correspond to a sound source (which may be a point sound source, a distributed source, or indeed a non-spatially located diffuse (e.g. ambient) source. In addition, the audio scene data includes position data which provides position information for one, more, or all of the audio components.

In the specific example, the audio scene is represented by a number of audio objects with each audio object being an independent and separate audio source. Thus, each audio object can be processed and rendered separately from other audio objects. Specifically, in many embodiments, the audio scene data comprises individual sets of audio data, each set providing a complete audio description of an audio object. Further, individual position data may be provided for each (or at least some) of the audio objects.

In some embodiments, each audio component may thus be an individual audio object which can be processed independently and separately from other audio components.

In the specific example, the audio scene data may thus further comprise position information for each audio object. Specifically, the audio scene data may comprise metadata which provides position information for all or some of the audio objects. Thus, the audio scene data describes an audio scene comprising a number of audio sources represented by audio components (and specifically audio objects). Specifically, the audio scene data comprises both information on the audio produced by the audio sources as well as their position in the audio scene.

In many embodiments, at least some of the audio components/audio objects will correspond to point audio sources having a single associated position. In some embodiments, the audio scene data may include audio components that do not correspond to point source audio sources. For example, one or more of the audio sources may correspond to more spread or distributed audio sources. Indeed, in some scenarios, one or more of the audio components may correspond to fully distributed audio sources, such as e.g. audio sources that represent diffuse ambient sounds.

The audio receiver 101 is coupled to an adapter 103 which is arranged to adapt at least one of the audio components. The adaptation is based on a variable focus distance which is received from a distance unit 105.

The distance unit 105 is thus arranged to provide a variable focus distance to the adapter 103. The variable focus distance may provide an indication of a distance or even a position in the audio scene at which the listener/user is currently considered/assumed/estimated to be focusing his intention. The variable focus distance is indicative of a distance from a reference position in the audio scene. The variable focus distance thus provides a distance from the current reference position in the audio scene. The reference position may specifically be a listening position where the listener/user/viewer is considered to be and thus the distance indicated by the variable focus distance is assumed to be a distance at which the user is currently focusing (or wants to focus) and the adapter 103 is arranged to adapt at least one of the audio components such that there may be increased perceptual emphasis on audio sources at this distance from the reference position.

In some embodiments, the variable focus distance may be provided from a specific user input. For example the distance unit 105 may comprise a user input, e.g. in the form of a slider. The user may then manually adjust such a slider to directly change the focus distance. Thus, in some embodiments, the variable focus distance may directly be set manually by a user. In other embodiments, the variable focus distance may be determined automatically or semi-automatically, e.g. by tracking eye movements. The focus distance may be varied for a given reference point/listening point in the scene. In particular, for a fixed/unchanged reference point, the focus distance may be varied and thus may be set to different values.

For brevity, the variable focus distance will in the following also be referred to simply as a focus distance.

In some embodiments, the focus distance may provide a three dimensional position in the audio scene from which the distance can be determined, e.g. by a geometric calculation or by extracting relevant data. Thus, in some cases, the focus distance may be provided by a three dimensional position from which a distance to a reference position can be calculated. In other embodiments, the focus distance may comprise only a one dimensional indication. For example, it may directly provide a single distance value which can directly be used as a focus distance.

The focus distance may in some embodiments be a three dimensional distance relating to a three dimensional audio scene, but may in other embodiments be a two dimensional or one dimensional distance, i.e. the focus distance may only relate to e.g. two or one dimensions out of a three dimensional space.

The adapter 103 is arranged to adapt a perceptual emphasis property of one or more of the audio components in response to the position of the audio components and the focus distance. The perceptual emphasis property may be any property that may affect the perceived emphasis of the audio component in the audio scene. Thus, by modifying the perceptual emphasis property, the relative perceived significance or distinctiveness of the audio source may be modified. In this way, a given audio component may be modified to stand out more in the audio scene (or to stand out less).

Specifically, for a given spatial audio component, referred to as the first spatial audio component, the perceptual emphasis property is modified relative to at least one other audio component in response to a difference measure reflecting a difference between the focus distance and a distance from the reference position to the position of the first spatial audio component.

The distance may be a three dimensional distance (specifically a three dimensional Euclidian distance) or may e.g. be a two-dimensional or one dimensional experience. For example, the distance may be determined as the projection of a three-dimensional distance on a two-dimensional plane or on a one dimensional direction, such as an axis of a three dimensional coordinate system. For example, the audio scene may be represented by positions in a Euclidian three-dimensional coordinate system (x, y, and z coordinates). The distance may relate to a three dimensional distance in such a coordinate system (e.g. determined as the root of the squared difference for each coordinate). However, the distance may also be determined as a distance in two of the coordinates (i.e. one of the coordinates may be ignored). In some embodiments, the distance may be determined considering only one coordinate (e.g. only considering the z-coordinate).

For example, the distance may be used to indicate a three dimensional distance from a reference position to a desired focus point in the audio scene. As another example, the distance may be a one dimensional distance defining a two-dimensional focus plane.

Thus, the adapter 103 may determine the distance between the reference position in the audio scene and the position of the first spatial audio component. In some embodiments, the reference position may be fixed and indeed the audio scene may be described relative to this reference position. For example, the positions of all the audio sources/audio components/audio objects may be given relative to a nominal reference position. The distance from an audio component to the reference position can be calculated directly from the coordinate values of the position of the audio component. Indeed, if the positions are given by polar coordinates, the length coordinate can directly be used as the distance between the first spatial audio component and the reference position (in the audio scene). If e.g. rectangular coordinates are used, the distance can be calculated by simple geometric calculations.

The reference position is the reference position in the audio scene. The adapter 103 is accordingly arranged to adapt the property of the first spatial audio component dependent on how the position of the first spatial audio component relates to the virtual reference position in the virtual audio scene.

The adapter 103 compares this distance, i.e. the distance from the position of the first spatial audio component to the reference position, henceforth referred to as the audio source distance, to the focus distance and generates a difference measure which indicates how much these deviate from each other. The difference measure may have an increasing value/difference (or absolute value/difference) for an increasing difference between the audio component distance and the focus distance. The difference measure may be a monotonic and continuous function of the difference between the audio component distance and the focus distance.

It will be appreciated that different difference measures can be employed in different embodiments dependent on the individual requirements and preferences of the specific application. In many embodiments and scenarios, a simple difference measure simply subtracting the two distances from each other may be used.

The adapter 103 may then adapt a perceptual emphasis property of the first spatial audio component relative to one or more of the other spatial audio components based on this difference measure. Typically, the perceptual emphasis property of the first audio component is adapted (thus the adaptation will be relatively to all other audio components). However, it will be appreciate that in some embodiments, a perceptual emphasis property of one, more or typically all of the other spatial audio components may be modified thereby resulting in the relationship between the perceptual emphasis property of the first spatial audio component and the perceptual emphasis property of other audio component(s) being changed despite the perceptual emphasis property of the first spatial audio component not being changed.

The perceptual emphasis property may specifically be an (audio) level of the first spatial audio component relative to one or more of the other spatial audio components. Specifically, the adapter 103 may be arranged to adapt the level of the first audio component in response to the difference measure, and may specifically be arranged to increase the audio level the lower the difference measure, i.e. the closer the audio component distance is to the focus distance.

Accordingly, if the first audio component is close to the focus distance, the level of the audio source corresponding to the first audio component will be increased relative to when the first audio component is further away from the focus distance. Thus, if the audio source is close to the current (assumed/indicated) focus of the listener, the volume of the audio source will be increased thereby making the audio source stand out more in the audio scene. In this way, the emphasis on the audio source relative to other audio sources will depend on how close it is to the position of the listener's current focus.

It will be appreciated that rather than increasing the level for the first audio component, the adapter 103 may reduce the level for one or more other audio components in the audio scene, or indeed may do both. For example, for a decreasing difference measure, the audio level may be increased for the first audio component and may be reduced for all other audio components such that the overall combined audio level for the scene remains constant.

It will be appreciated that the adapter 103 may proceed to apply a similar processing of all audio components, or e.g. to a suitable subset of audio components such as e.g. all audio components corresponding to point audio sources. Thus, the adapter 103 may effectively apply a variable gain or weight function across the audio stage with the weights at different positions depending on the distance to the reference position, and specifically to the difference between this distance and the focus distance. The closer the audio component is to the focus distance, the higher the gain may be. In this way, the adapter 103 may apply an adaptation or modification to the audio stage (formed by the audio components) such that audio sources that are closer to the listener's specific current focus are emphasized to stand out more in the perceived audio scene.

The adapter 103 is coupled to an audio renderer 107 which is arranged to render the audio scene by rendering the spatial audio components. The audio renderer 107 is a spatial renderer which can render the audio components such that they are perceived to originate from a given position (e.g. using a surround sound arrangement or headphones with signals generated by binaural processing as will be described in more detail later). Thus, the audio renderer 107 may effectively reproduce the audio scene.

The audio renderer 107 receives the position data extracted from the audio scene data and proceeds to render the audio components at positions which for at least one audio component is determined based on the received position data. Specifically, the audio renderer may be arranged to render one or more audio components at positions corresponding to those indicated by the position data. Thus, the audio scene is rendered with the position information being maintained and the perceived spatial structure of the audio scene is maintained the same as given by the input data. However, the audio sources can be modified so that audio sources close to a desired e.g. focal plane will be more emphasized relative to audio component further away from the focal plane. Thus, audio sources of specific interest may stand out more while at the same time the spatial consistency and arrangement is maintained the same such that the audio scene is not perceived to be spatially changed.

It will be appreciated that in some embodiments, the renderer may amend or modify the position of one or more of the audio components. For example, a user may be arranged to shift the position of a specific audio component in the scene by providing a user input to the renderer.

The approach of the system of FIG. 1 may provide an improved user experience in many embodiments and may in particular provide a more flexible user experience, where the audio presentation to a user is adapted to the current characteristics of the user thereby allowing the user to dynamically and flexibly change the focus to different parts of the audio scene. Thus, rather than having a fixed and inflexible audio stage being rendered based on the received audio scene data, the approach allows a user side adaptation which allows the user to highlight or emphasize different audio sources that are dynamically selected (manually or automatically).

The variable focus distance may be dynamically changed by a user in many embodiments. Indeed, in many embodiments, such as e.g. in virtual reality applications, the user may be arranged to control a reference point within an audio scence where the reference point corresponds to a listening position in the audio scence. The control of the reference point may in many embodiments be manually controlled by the user, e.g. by use of a joysitck, gamepad, keyboard, motion detector etc. However, in addition to this control, the user may also control the focus in the audio scene. This is achieved by the variable focus distance which is provided relative to the reference position. In particular, for a given reference point, the focus distance can be varied to provide difference focus points/areas relative to that reference point. Indeed, the control of the focus distance and the control of the reference point may be independent of each other.

Thus, the focus distance is variable with respect to the reference point and is not a fixed, or predetermined area defined by the reference point. The variable focus distance may for example be determined in response to a user input, e.g. allowing the user to, for a fixed listening/reference position in the audio scene, dynamically change the audio focus in the audio scene. In some embodiments, the focus distance may for example be determined dynamically in response to an automated user behaviour detection, such as a detection of a head movement or an eye movement. This may for example allow a listener to remain at a fixed listening position within an audio scene but to change the audio focus dynamically within the scene. Thus, the listener may dynamically change the focus in the audio scene e.g. picking out sound sources in different parts of the scene.

The spatial audio processing apparatus may in particular provide an effect which is similar to a visual approach where e.g. a focus plane can be changed dynamically at the user side such that the objects in a scene that are in focus can be selected at the time of rendering.

For example, a scene may be captured by a light field camera with the resulting image data being encoded and distributed. In addition, the audio of the scene may be captured by a set of microphones allowing spatial characteristics to be determined for different audio components. Corresponding audio scene data describing the audio components and associated position information may be generated and an audio visual signal may be generated comprising the image data and the audio scene data.

The audio visual signal may be distributed and an end user device may then process the corresponding visual and audio data resulting in the rendering of a three dimensional audio visual experience.

Specifically, the image data may be processed at the user end such that an image is generated with the focus plane being selected at the time of rendering. For example, a slider may be provided to a user allowing the user to move the focus plane forward and back in the scene merely by moving the slider. This will result in different image objects coming into and out of focus depending on the setting of the slider and their distance to the viewing position.

At the same time, the slider may control the spatial audio processing apparatus such that audio sources close to the focal plane are emphasized relative to audio sources that are further from the focal plane. Indeed, the reference position may correspond to the viewer position for the image (i.e. it may correspond to the position of the light field camera when the image of the scene is captured) and the focus distance may be set to correspond to the distance from this position to the focal plane. As a result, the audio objects close to the focal plane will e.g. have increased audio level compared to the level when the focal plane is at other distances.

As an example, the approach may provide a slider where the user can move the focal plane back and forth in the image while at the same time experiencing that the audio adapts to match the focal plane changes. Thus, as an image object corresponding to a sound source (e.g. a speaker or a radio) comes into focus, the sound source also becomes louder and more prominent in the audio scene.

The approach may thus process audio visual data representing a virtual scene (e.g. derived by capturing a real scene using a light field camera and spatially sensitive microphone arrangements) in order to provide a flexible user side selection/control of what in the scene the user will focus on. The audio and video sides can be arranged to support each other and provide corresponding experiences thereby providing a substantially more interesting and desirable user experience. In particular, a virtual reality effect can be provided where the user actions can result in the presentation and user perception of the scene dynamically changing such that the user can control the perception of the scene.

In many embodiments, the adapter 103 may determine a value of the perceptual emphasis property, such as an audio level or a gain, as a continuous function of the difference between the variable focus distance and the distance in the audio scene from the reference position to the position of the first spatial audio component. A gradual dependency may be provided such that the emphasis of audio components gradually decrease the further away they are from the focus. This may provide an advantageous effect which is specifically important when the focus distance is dynamically varied.

In particular, the approach may be particularly advantageous in an embodiment where the user with respect to a fixed listening position may dynamically move the focus around in the audio scene with audio components coming into and moving out of focus. The gradual effect achieved by a continuous function will make this result in a much more natural and less noticeable effect.

The adapter 103 is also in many embodiments arranged to adapt the perceptual emphasis property to reduce an emphasis of the first audio component for an increasing difference measure, where the variable focus distance is larger than the distance from the reference position to the position of the first spatial audio component. Thus, the emphasis is not merely put on audio sources close to the listener but rather the adapter may reduce the emphasis, e.g. by reducing the audio level or gain for audio components the closer they are to the listening position, and thus the further they are from a focus area indicated by the focus distance.

Such an effect may provide an improved experience where the emphasis may be positioned on areas that are more distant to a listening position. For example, for a virtual reality audiovisual experience providing both audio and visual rendering, a user may change a focus from, say, a speaker close to the reference position to, say, a television in the background of the scene. This may result in the visual focus shifting from the speaker to the television resulting in the speaker being less noticeable and the television being more noticeable. The same effect is provided in the audio domain where not only the television is made louder but the speaker is also made quieter. E.g. the rendering may change from the speaker being clear and loud to the television being clear and loud. Thus, the effect to the listener may be that the audio adapts automatically from him "hearing" the speaker to him "hearing" the television.

Figure 2:
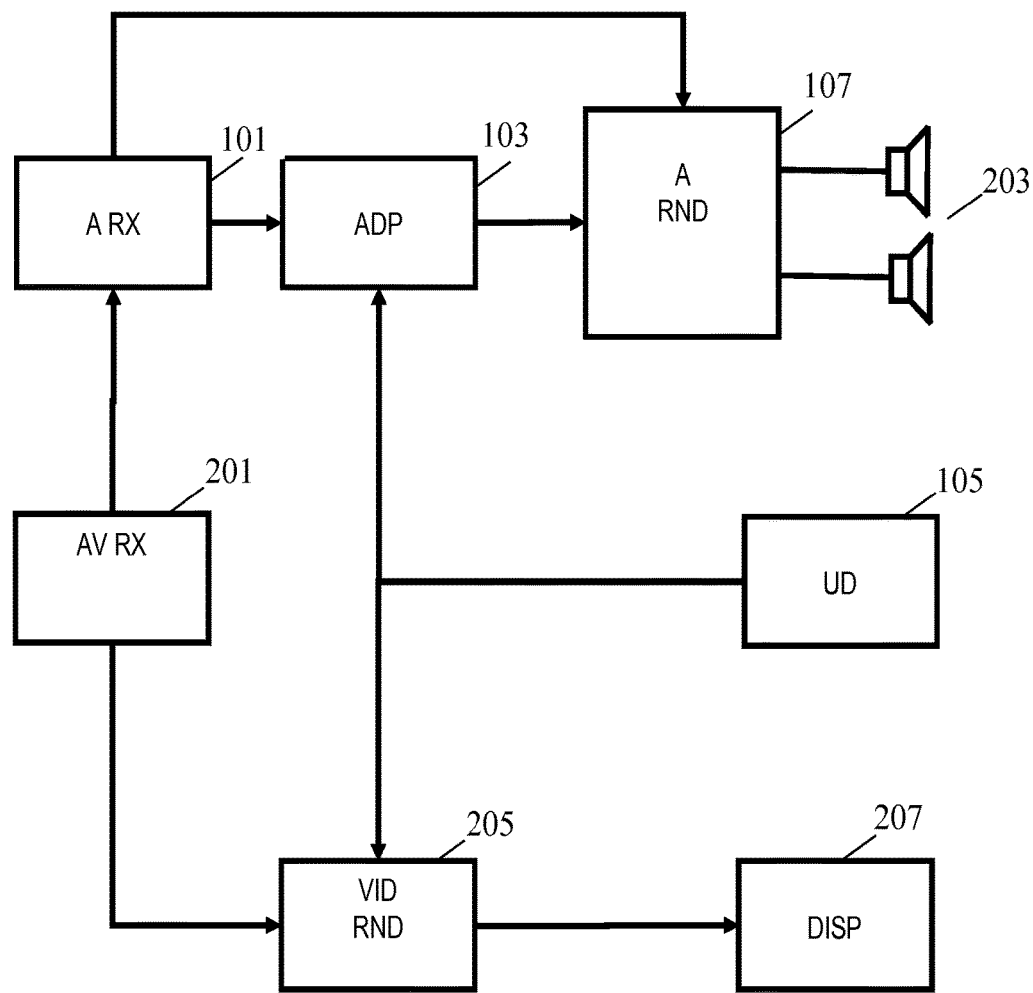
FIG. 2 illustrates some elements of a virtual reality system in accordance with some embodiments of the invention.

FIG. 2 discloses a virtual reality system which is arranged to render a three dimensional audio visual scene to a user while allowing the user to dynamically adapt the presentation of the audio scene, and specifically allows the user to dynamically change the presentation of the scene. Indeed, the user may change the focus in the scene, and may in many embodiments also dynamically change the listening and viewing direction or position.

The virtual reality system comprises an audiovisual receiver 201 which receives audio visual data describing a scene. The audio visual data comprises audio scene data as previously described and in addition comprises three dimensional image (or video) data.

The virtual reality system comprises the spatial audio processing apparatus of FIG. 1 and the audiovisual receiver 201 is arranged to extract the audio scene data and feed it to the audio receiver 101 where it may be processed by the adapter 103 as previously described.

The adapter 103 is coupled to the audio renderer 107 which is further coupled to a set of audio transducers 203. The audio renderer 107 is arranged to render the audio components after the adaptation by the adapter 103 such that the modified audio scene is rendered via the audio transducers 203. The rendering is however based on the original position data and in many cases with the audio components being rendered to correspond to the positions indicated by the position data.

The audio transducers 203 may for example be headphones or earphones, and the audio renderer 107 may include functionality for driving such headphones or earphones to provide a three dimensional spatial experience. For example, the audio renderer 107 may include functionality for binaural processing and rendering, including processing of audio components using Head Related Transfer Functions (HRTFs) etc. as will be known to the skilled person.

In some embodiments, the audio transducers 203 may be a plurality of speakers positioned so as to provide a spatial experience to a listener. For example, the audio transducers may be a set of surround sound speakers, e.g. forming a 5.1 or 7.1 surround sound speaker setup.

The audio renderer 107 may be arranged to use any suitable approach for rendering the audio scene, and it will be appreciated that many different approaches for spatial audio rendering will be known to the skilled person who may implement an approach suitable for the specific preferences and requirements of the individual embodiment.

It will also be appreciated that the distribution of functionality for the audio path may vary between different embodiments. For example, in some embodiments, the audio receiver 101 may perform audio decoding applied to e.g. individual audio objects to generate a separate audio signal for each audio component. The adapter 103 may implement variable gains for the different audio components where the gain for a given audio component depends on the difference measure for the audio component. The resulting audio signals may then by the audio renderer 107 be processed by HRTF functions and combined into a binaural signal for a headphone.

As another example, the audio data for the audio objects may be fed directly to the audio renderer 107 together with data from the adapter 103 indicating a relative level adjustment/gain for the individual audio object (determined based on the difference measure). The audio renderer 107 may then decode the audio objects, apply the level adjustment and combine the resulting audio signals into audio channel signals for surround sound speakers (with the weights for each channel depending on the position of the individual audio object).

Thus, it will be appreciated that whereas FIGS. 1 and 2 shows a specific distribution, sequence, and partitioning of functionality in the audio path, other embodiments may implement other distributions, sequences, or partitions of functionality. For example, the gain adjustment may e.g. be part of the rendering or may e.g. be performed prior to decoding of audio data.

The virtual reality system furthermore comprises a video renderer 205 which is coupled to the audiovisual receiver 201 and to a display means 207.

The display means 207 is arranged to provide a visual output to the user allowing the user to view the scene represented by the received audiovisual data. The display means 207 may be a two dimensional display or may be a three dimensional display, or e.g. a pair of stereo image glasses. The display means 207 may specifically in many embodiments be a set of stereo displays for a virtual reality headset or may e.g. be an autostereoscopic display.

The video renderer 205 is arranged to receive the visual scene data from the audiovisual receiver 201 and to drive the display means 207 to present a visual representation of the scene. It will be appreciated that many different approaches and techniques for driving displays (whether 2D or 3D) from three dimensional image or video data will be known to the skilled person and that any suitable approach can be used.

In the specific example, the received three dimensional image data is received from a light field camera. Accordingly, the video renderer 205 may generate e.g. a two dimensional output image by processing the data to generate the image with the focus at a specific distance, i.e. the video renderer 205 may be arranged to process the received visual data to provide a varying focal plane.

The video renderer 205 is coupled to the distance unit 105 and is arranged to also receive the focus distance. The video renderer 205 may then adjust the focal plane depending on the indication of the focus distance.

Thus, in the system, a user may manually adjust a manual input, such as a slider, to move the focal plane back and forth in the presented image. In line with this visual adaptation, the audio is adapted such that audio objects located close to the current focal plane are emphasized relative to other audio objects. Thus, a desirable user experience can be provided which provides the user with a flexible system where an audiovisual presentation can be dynamically modified at the user end. For example, the user can manually adapt the presentation. Furthermore, a closely linked adaptation of the audio and visual representation can be provided thereby providing a very consistent user experience.

It will be appreciated that in some embodiments, it is not just a focus distance in the form of a distance from a fixed point that may be changed by the user but indeed in some embodiments the user may also adapt the position (or e.g. viewing direction) of the user in the virtual scene. For example, in some embodiments, the visual data may be provided in the form of a three dimensional model of a virtual environment and the audio scene data may be provided as audio objects linked to that model (specifically with positions of the audio objects being given as positions within the model). The user may control a movement of a virtual position of the user in the virtual environment and the video renderer 205 may dynamically change the presented image(s) to reflect this movement. In addition, the adapter 103 may dynamically calculate the distances from the current reference position to the audio objects and dynamically adapt the audio level/gain for the audio objects to reflect these variations.

The adapter 103 may specifically be arranged to adapt the perceptual emphasis property, such as the audio level, without actually resulting in a change in position of the corresponding audio source/audio component in the scene. Specifically, the relative positions of the audio sources/audio components may remain the same despite the flexible amendment. Indeed, the adaptation does not affect the received position data but rather this is fed to the audio renderer 107 which may use it to render a spatial audio scene. In many scenarios it may position the audio components at the positions indicated by the position data thus resulting in the positions of the audio components being rendered at the original positions. Thus, the perceptual emphasis/distinctiveness of the individual audio components may be changed relative to each other while the positions are kept the same.

Thus, despite the change in a perceptual emphasis property, the adapter 103 may perform the adaptation without substantially altering the perceived position. Thus, the spatial cues provided by the rendering of the audio component may be substantially independent of the adaptation being performed in response to the difference measure.

Indeed, in most embodiments, the adapter 103 may be arranged to modify the perceptual emphasis property without any changes in the timing of the audio component relative to other audio components, i.e. the adapter 103 is arranged to adapt the perceptual emphasis property without changing a temporal relationship between the spatial audio components. Specifically, the relative arrival times at the listener's ears are not varied in response to the focus distance and thus the relative Interaural Time Differences (ITDs) for different audio sources is maintained constant. Since the ITD is typically the most significant perceptual spatial cue, the positions of the audio sources will be perceived to be from the same positions in the audio scene. Accordingly, the user will perceive that audio sources close to a user focus distance are emphasized in the audio scene but that the audio sources remain at the same positions.

As described previously, the adapter 103 may be arranged to adapt an audio level of at least a first spatial audio component of the spatial audio components relative to at least one other audio component of the audio scene in response to a difference measure reflecting a difference between a distance in the audio scene from the reference position to the position of the first spatial audio component and the focus distance. Typically, the audio level may be adapted for a plurality of audio objects and in some scenarios the audio level of all audio components may be modified.

The adapter 103 may specifically be arranged to apply a gain to the spatial audio components where the gain for a spatial audio component is dependent on a difference between the focus distance and a distance from the reference position to the spatial audio component. Specifically, the adapter 103 may increase the gain for a spatial audio component relative to other audio components for the difference measure being indicative of a decreasing measure. Thus, the gain may be applied to audio components where the gain is a monotonically decreasing function of the difference measure.

The gain may in some embodiments be generated by a multiplication of the individual audio components by a given gain factor determined as a function of the difference measure. The gain may e.g. in some embodiments be applied after the decoding of the audio component. Specifically, the decoded signal values may be multiplied by the gain factor. As another example, the gain may in some embodiments be performed by directly amending encoded audio data. For example, if individual audio components are provided as a nominal audio level signal data and an associated parameter indicating the audio level of the corresponding audio source, the adapter 103 may simply modify the audio level parameter.

The adapter 103 may accordingly be arranged to modify the levels of the individual audio components relative to each other, in dependence of their distance to the selected "in-focus" distance relative to the user viewpoint.

The levels of the individual audio components may be modified using a level weighting curve that has its maximum at the selected in-focus distance and decreases gradually for increasing radial distance from this in-focus distance (as seen from the user viewpoint). As an example, a Gauss curve may be used.

In some embodiments, the gain is determined as a function of the difference measure which is asymmetric with respect to distances from the reference position to the position of the first audio component relative to the focus distance. Thus, the function may vary asymmetrically with respect to the distance to the audio component being larger than the focus distance or it being smaller than the focus distance.

Specifically, in many embodiments the gain may for a given distance difference be lower for distances higher than the focus distance than for distances lower than the focus distance. In particular, in some embodiments, a minimum audio level for audio components may be applied to audio components closer to the user than the focus distance than for audio components further away than the focus distance (or possibly vice versa).

Such an approach may in many scenarios provide an improved user experience. It may specifically provide an adaptive audio scene which may appear more realistic to many users. The approach may reflect that audio sources close to the user are typically perceived to be significant and have relatively high (or not insignificant) levels whereas more distant audio sources may have very low levels. Accordingly, the approach may prevent that an unrealistic audio scene is perceived due to too excessive attenuation while still allowing higher attenuation of audio sources that do not cause such an effect. The approach may thus assist in preserving the natural property that objects that are closer to the listener have a higher sound level than objects that are further away ("1/r law").

The described approach may be particularly suitable for complimenting images from light field cameras where the focus plane can be adjusted by the user at the time of usage. Indeed, the approach may allow an interactive audio processing mechanism that enables rendering-time changing of the "in-focus" distance of a rendered audio scene. The audio focusing control mechanism may be coupled to a corresponding focusing control mechanism for the visual part of the system, and a single control parameter may be used to control and align the focusing mechanisms of both modalities. Thus, the same control may affect both the visual focus and the audio focus perceived by a user.

In contrast to e.g. audio zooming using beamforming techniques based on microphone arrays, the described approach may seek to balance sound levels of sources that are located in different distance layers relative to the user, but leaving their spatial relationship with respect to each other and to the user intact. Indeed, beamforming techniques seek to isolate as much as possible the sound coming from a certain direction or from a sound source at a certain point in space, suppressing all other sound sources/directions as much as possible. The current approach may dynamically emphasize sound sources close to a given focus distance, corresponding to the post-focusing concept for light field cameras. For such cameras, the visual objects at other distances are still visible in the rendered image and their spatial relationship remains the same, but the relative sharpness of different objects can be varied as the focal plane is changed. The current approach may provide a corresponding effect for audio where all audio sources remain but some audio sources become perceptually more significant when close to the selected focal plane.

In some embodiments, a 360-degree (or even 3D spherical) VR rendering scenario may be provided. The described audio processing approach may enable the user to e.g. look around, and have control over the distance relative to his viewpoint at which objects in the virtual scene are both seen and heard with maximum "sharpness". In other words: it is an alternative interaction mechanism next to the known "zooming" approach where objects at the zooming distance are effectively brought closer to the user (or, equivalently: the viewpoint of the user is moved towards the zooming point).

The previous description has focused on embodiments where the perceptual emphasis property that is modified is an audio level (or gain) for the individual audio components. However, in other embodiments, other properties may additionally or alternatively be adapted to change the emphasis or e.g. perceived "sharpness" of the audio components close to the focus distance.

In some embodiments, the perceptual emphasis property may be a diffuseness property for the first spatial audio component. The diffuseness of a rendered audio signal may affect how localized the audio source is perceived to be. Typically, as the measure of diffuseness properties of an audio signal is increased, the perceived spread or non-locality increases. Conversely, by reducing the diffuseness property, the audio source may be perceived as a more localized and specific audio source (closer to a point source). Accordingly, the audio source may be perceived as "sharper" when the degree of diffuseness is reduced.

In many embodiments, the adapter 103 may be arranged to decrease a degree of diffuseness for the first spatial audio component relative to one or more of the other spatial components for the difference measure being indicative of a decreasing measure. The adapter 103 may accordingly determine a diffuseness parameter as a function of the difference measure with the diffuseness parameter being modified to decrease the diffuseness degree the smaller the difference measure is.

In some embodiments, the diffuseness parameter may directly be amended by amending a parameter indicating the diffuseness that should be applied when an audio component is rendered. For example, some audio standards that support object-based audio, such as ADM, MDA and MPEG-H 3D Audio, already contain object metadata that can be used to control the diffuseness of rendered objects. A weighting function similar to that described for the level modification can be applied to the diffuseness properties of the audio objects, with a minimal diffuseness weighting being applied to objects at the selected in-focus distance (so these are rendered as maximally "sharp"), and increasing diffuseness weighting for objects at increasing radial distance from the in-focus distance (so that objects located far away from the in-focus distance are rendered as more and possibly highly diffuse).

As another example, the adapter 103 may be arranged to modify the time domain spread of an audio signal dependent on the difference measure. For example, the audio signal for an audio component may be convolved with an impulse response. For a very localized source, the impulse response may have energy concentrated in a very short time interval and specifically may be a single Dirac pulse. However, for a more diffuse source, the energy may be spread over a longer duration corresponding to an increasing number of reflections, and e.g. may include reverberation tails corresponding to spread responses rather than individual reflections. Thus, the impulse response may include reverberation effects etc. In some embodiments, the adapter 103 may for example select between a plurality of predetermined impulse responses corresponding to different degrees of diffuseness. The selection may be based on the difference measure and the selected impulse response may be applied to the audio signal resulting in a diffuseness which is dependent on how close the audio component is to the focus distance.

In such examples, the temporal rendering of an audio component may be amended thereby introducing diffuseness. However, alternatively or additionally, a spatial rendering may be modified to increase diffuseness of an audio component. In such approaches, the correlation between the two ears of a listener may be reduced to increase diffuseness of the audio component.

Specifically, the perceived diffuseness may depend on the temporal spread of the signals as well as the correlation between the ears of listener. More information on diffuseness for audio applications may e.g. be found in "Acoustics and Audio Technology (Acoustics: Information and Communication)" by Mendel Kleiner, J Ross Publishing, 2011, ISBN 1604270527 or "Communication Acoustics" by Pulkki, John Wiley & Sons, 2015, ISBN 1118866541.

In particular, the perceived diffuseness is typically dependent on the level difference between direct sound and reverberant sound. An indication of this difference may directly be determined as:

$$L_{Ind} = L_{Reverberation} - L_{Direct}$$

or e.g. as the ratio between the levels:

$$L_{Ind} = \frac{L_{Reverberation}}{L_{Direct}}$$

or the proportion of the reverberation signal level relative to the total level:

$$L_{Ind} = \frac{L_{Reverberation}}{L_{Direct} + L_{Reverberation}}$$

where $L_{Direct}$ is the level of the direct sound components, $L_{Reverberation}$ is the level of the reverberation sound components, and $L_{Ind}$ is the indication of the relationship between these (the indication increasing for an increasing diffuseness).

Thus, in some embodiments, the adapter 103 may be arranged to adapt a relationship between a level of direct sound relative to a level of reverberant sound in response to the difference measure, and specifically may increase the level of the reverberant sound relative to the direct sound for an increasing difference measure.

It will be appreciated that the direct sound and the reverberant sound may be defined, determined, and controlled in different ways in different embodiments depending on the individual preferences and requirements. For example, in some embodiments, the direct sound component may correspond to all peaks corresponding to direct sound paths (e.g. to all Dirac pulses in an impulse response) with the remaining signal corresponding to a reverberant sound component.

In other embodiments, the sound components may be differentiated purely on a time basis with the direct sound components being determined as those corresponding to the components arriving at the listener with a transmission time of less than a first time threshold and the reverberant sound being determined as those corresponding to components arriving at the listener with a transmission time of more than a second time threshold (typically larger than the first time threshold). For example, the audio signal for a given spatial audio component may be processed by a (diffuseness) filter having an impulse response. The level of the direct sound may be determined as the energy of the impulse response prior to a first time threshold of e.g. 20-100 msec. This corresponds to direct sound and early reflections in a typical room. The level of the reverberant sound may be determined as the energy of the impulse response after a second time threshold of e.g. 70-150 msec. This may correspond to (typically non-distinct) reverberation in a typical room.

The adapter 103 may for example switch between different (diffuseness) filters having different impulse responses in order to provide an impulse response which results in the desired relationship between direct and reverberant sound, and thereby the desired variation in diffuseness. For example, a look-up table may be provided with a number of impulse responses and the adapter 103 may select between these based on the difference measure.

Alternatively or additionally, the adapter 103 may as mentioned be arranged to vary a correlation between the signals at the two ears of a listener depending on the difference measure. Specifically, the adapter 103 may be arranged to vary an interaural correlation depending on the difference measure, and specifically may be arranged to reduce the interaural correlation for an increasing difference measure.

Specifically, an interaural cross-correlation coefficient (ICCC) may be defined as:

$$ICCC(\tau) = \frac{\left[\int_{t1}^{t2} x(t)y(t+\tau)dt\right]}{\left[\int_{t1}^{t2} x^2(t)dt \int_{t1}^{t2} y^2(t)dt\right]^{1/2}}$$

where x(t) and y(t) are the signals of the two ears, $\tau$ is an offset between the channels (depending on the direction of the sound source to the listener) and t1 and t2 are suitable time limits for the integration (which may typically be over e.g. 50-100 msec).

The adapter 103 may be arranged to process the signal to adapt the ICCC dependent on the difference measure. For example, the impulse responses may be stored for a bank of filters with the impulse responses being different for the right and left ear. The degree of difference, and thus the correlation between the left and right ear, may be different for different filter pairs, and thus the adapter 103 may, depending on the difference measure, select a pair of impulse responses resulting in the desired ICCC. As a specific example, the impulse responses may have slightly different delays for different frequency bands, with the delays varying (as a function of frequency) differently for the right and left ear respectively.

The control of diffuseness by controlling the interaural cross-correlation may often be particularly suitable for headphone rendering applications whereas the control of diffuseness by controlling the direct vs reverberant sound may often be more suitable for rendering using a spatial loudspeaker setup.

In this way, audio sources that are close to the focus distance may be perceived as more specific and spatially definite than audio sources that are further from the focus distance.

In some embodiments, the adapter 103 may additionally or alternatively be arranged to amend a frequency signal distribution for the first spatial audio component dependent on the difference measure for the first spatial audio processing apparatus.

Thus, the energy distribution in the frequency domain of the audio component may be varied dependent on the difference measure. The adapter 103 may specifically filter the audio component signal by applying a filter that has a frequency response which depends on the difference measure. For example, the adapter 103 may filter the signal by a low pass filter and a high pass filter and then generate a combined signal by a weighted combination of the filtered signals. The weights may be determined as a function of the difference measure.

The adapter 103 may specifically increase the high frequency signal components relative to the low frequency signal components the smaller the difference measure, i.e. the closer the audio component is to the focus distance.

An audio source may often be perceived to be more noticeable and to stand out more (and e.g. to be increasingly "sharp") when it has an increasing high frequency content. Accordingly, the system may amplify the high frequency content relative to the low frequency content the closer the audio object is to the focus distance thereby making audio objects closer to the focus distance more distinct and noticeable.

As another example, the system may emphasize frequency content in a specific frequency band/region. For example, the mid-high frequency band may be amplified/attenuated to modify the perceived emphasis of different audio sources.

Thus, in some embodiments, a spatial audio component may (when being rendered) be filtered by a filter which has a frequency response that is dependent on the difference measure. E.g., a modified audio signal may be generated as:

$$S_m(f) = S_{ac}(f) \cdot H(f, \Delta)$$

Where $S_{ac}(f)$ is the original audio signal for the spatial audio component in the frequency domain and $H(f, \Delta)$ is the filter which is dependent on the difference measure $\Delta$.

In particular, the system may first decode audio data for the spatial audio component to generate a time domain audio signal and this may then be converted to the frequency domain using an FFT. In each bin, the frequency domain signal may be multiplied by a filter coefficient where the filter coefficient for at least some bins is determined as a function of the difference measure.

In some embodiments, relatively complex functions may be used for determining each individual filter coefficient as a function of the difference measure. However, in many embodiments, a relatively simple approach may be used.

For example, in many embodiments, the coefficient for a frequency midrange may be 1, i.e. the audio signal value in that bin is not modified. For high frequencies, the coefficient may be increased for an increasing difference measure while for low frequencies, the coefficient may be reduced for a decreasing difference measure. Thus, the high frequency emphasis is increased relative to the low frequency emphasis for a decreasing difference measure, i.e. high frequency content is emphasized for audio objects close to the focus distance and deemphasized for sources further away.

In many embodiments, the adapter 103 may be arranged to select between a range of different filters with different frequency responses depending on the difference measure. Thus, a look-up table may comprise a bank of filters and the adapter 103 may select between these based on the difference measure.

It will be appreciated that such filters may in many embodiments vary both the frequency distribution of the signal of the audio component as well as the diffuseness of this. Thus, the stored filter response may vary both the frequency response and the interaural cross correlation and/or the relationship between the direct and reverberant sound components.

In many embodiments, the frequency selective filtering of the spatial audio component signal may include a normalization such that the overall energy/level of the signal is not modified.

In the system, the perceptual emphasis/de-emphasis of different audio sources may accordingly be achieved fully or partially by modifying how the signal energy is distributed in the frequency domain. Specifically, a filtering by a filter having a frequency response which depends on the difference measure may be applied to the spatial audio component signal thereby resulting in the frequency signal distribution (specifically how the energy of the signal is distributed in the frequency domain) varying as a function of the difference measure.

The frequency signal distribution may be determined as the distribution of the signal energy in the frequency domain. For example, a segment of an audio signal for a spatial audio component may be selected and converted to the frequency domain using an FFT. Prior to adaptation, this may provide a given set of frequency values corresponding to a given distribution of the signal in the frequency domain (each value indicating the energy in that specific frequency bin). The same approach may be applied to the modified audio signal, i.e. after the adaptation depending on the difference measure has been performed. The frequency values of the different frequency bins may now have changed corresponding to a different distribution of the energy of the audio signal in the frequency domain. As the adaptation is dependent on the difference measure, the values in at least some frequency bins will also depend on the difference measure and thus a different frequency signal distribution is achieved which is a function of the difference measure.

A simple measure/indication of the frequency signal distribution may simply be the energy in a lower frequency interval compared to the energy in a higher frequency interval. This relationship may in many embodiments be modified depending on the difference measure.

It will be appreciated that whereas such a frequency signal distribution can be measured directly on the signals, the modification of the frequency signal distribution based on the difference measure is typically performed without any explicit measurements but simply arises from the application of frequency varying filters where the filters depend on the difference measure.

In some embodiments, the processing of the audio components may not only depend on the distance from the audio source position to the reference position but may also depend on a direction from the audio source position to the reference position, i.e. the difference measure may be dependent on a direction from the reference position to the position of the first spatial audio component. Specifically, the difference measure may be dependent on at least one of an azimuth and elevation difference between a position indicated by the focus distance and the position of the first spatial audio component when viewed from the reference position. Thus, in such embodiments the focus distance provided e.g. by a user may be provided as a position from which a distance can be determined and from which the azimuth and/or elevation with respect to the reference position can be determined. In other embodiments, the focus distance may directly provide a distance value and may in addition may include a position indication defining a specific position.

In some embodiments, the difference measure may be a composite value comprising a plurality of values, such as e.g. one being dependent on the distance from the audio source to the reference position and one being dependent on the direction from the audio source to the reference position.

In many embodiments, the system may thus provide a more differentiated emphasis on audio components, and specifically may increase the emphasis on audio objects that are in the direction in which the user is focusing. For example, the user may indicate a view direction and distance and the difference measure may reflect how close the audio components are to the indicated position. The described approaches for amending the perceptual emphasis property (e.g. the audio level, degree of diffuseness and/or frequency distribution) may be applied based on the determined difference measure.

The approach may provide an improved user experience in many situations. Indeed, in many use cases where audio is combined with corresponding video, it may not be desirable to bring all the audio objects "in focus" that are positioned at the selected in-focus distance anywhere in space. Rather, it may be preferable that only those that are within a limited spatial range around the viewing direction, or which are within the actual view of the user, are emphasized. Limiting the "focusing" of the audio in this way may be preferred over applying the maximum level weighting to all the audio objects that are at the selected in-focus distance, including objects that are e.g. located behind the user (relative to his viewpoint and—direction).

As described, this may be implemented by applying a difference measure as previously described but with a minimum in the viewing direction and with increasing values for an increasing angle (azimuth and/or elevation) relative to the viewing direction as well as for an increasing difference in the distance between the focus distance and the audio object to reference position distance. In a dynamic VR scenario where the user moves his head (or more generally: changes his viewing direction), this weighting function may be modified accordingly.

As an example, a distance measure may be calculated by determining a distance between the three dimensional position of the audio component and a three dimensional position indicated by the focus distance data. This distance, reflecting the distance in three dimensions, may in some embodiments be used directly as the difference measure. It will be appreciated that in some embodiments, the different dimensions may be weighted differently.

As another example, the difference measure may be derived as the multiplication of two weighting curves with one being dependent on the audio object to reference position distance relative to the focus distance and the other may be depending on the difference between the focus direction and the audio object to reference position direction.

In the previous examples, the user may manually control the focus indication and specifically the focus distance. However, in many embodiments the spatial audio processing apparatus may comprise a tracker which tracks the head, and specifically the eyes of a user. The focus distance, may then be determined by this head or eye tracking. The tracker may specifically perform a gaze or view detection to determine a position of focus for the user. Various approaches for such functionality have been developed including specifically approaches referred to as adaptive depth of field tracking.

The difference measure may then be determined based on this automated detection and the audio scene may be processed to increase the emphasis on audio objects close to the focus point of the user. The approach may thus provide a system that automatically adapts the audio scene to provide increased focus on audio sources proximal to where the user is looking in the visual scene. Thus, the system may automatically determine e.g. the distance at which the user is focusing his eyes, and this information may be used to control both the video- and audio focusing.

The described embodiments have focused on implementations where the audio scene data comprises individual audio objects representing at least some, and typically all, of the spatial audio components. Further, explicit position information, e.g. as metadata, has been assumed to be present for the audio objects.

Thus, in many embodiments, the audio scene may be described by a number of audio objects that are individually represented by audio data and associated metadata which specifically may include position information, and rendering information such as e.g. suggested level information, reverberation parameters etc.

In recent years, significant efforts have been put into developing a number of audio formats that represent individual audio sources as individual audio objects. Thus, rather than represent an audio scene by audio channels corresponding to specific (nominal or reference) positions, it has been proposed to provide individual audio objects which each represent a specific audio source (including e.g. background, diffuse and ambient sound sources). Typically, the audio objects may be provided with (optional) position information which indicates a target position of the audio object in the sound stage. Thus, in such approaches, an audio source may be represented as a separate and single audio object rather than by the contribution it makes to audio channels associated with specific, predetermined (loudspeaker) positions.

For example, in order to support audio objects, MPEG has standardized a format known as 'Spatial Audio Object Coding' (ISO/IEC MPEG-D SAOC). In contrast to multi-channel audio coding systems such as DTS, Dolby Digital and MPEG Surround, SAOC provides efficient coding of individual audio objects rather than audio channels. Whereas in MPEG Surround, each loudspeaker channel can be considered to originate from a different mix of sound objects, SAOC allows for interactive manipulation of the location of the individual sound objects in a multi channel mix.

Similarly to MPEG Surround, SAOC also creates a mono or stereo downmix. In addition, object parameters are calculated and included. At the decoder side, the user may manipulate these parameters to control various features of the individual objects, such as position, level, equalization, or even to apply effects such as reverb.

SAOC allows a more flexible approach and in particular allows more rendering based adaptability by transmitting audio objects in addition to only reproduction channels. This allows the decoder-side to place the audio objects at arbitrary positions in space, provided that the space is adequately covered by loudspeakers. This way there is no relation between the transmitted audio and the reproduction or rendering setup, hence arbitrary loudspeaker setups can be used. This is advantageous for e.g. home cinema setups in a typical living room, where the loudspeakers are almost never at the intended positions. In SAOC, it is decided at the decoder side where the objects are placed in the sound scene. However, whereas rendering side manipulation of audio objects are supported, it is typically desired that the audio can be rendered without requiring user inputs while still providing a suitable sound stage. In particular, when the audio is provided together with a linked video signal, it is desired that the audio sources are rendered at positions corresponding to the positions in the image. Accordingly, audio objects may often be provided with target position data which indicates a suggested rendering position for the individual audio object.

Other examples of audio object based formats include MPEG-H 3D Audio [ISO/IEC 23008-3 (DIS): Information technology—High efficiency coding and media delivery in heterogeneous environments—Part 3: 3D audio, 2014.], ADM [EBU Tech 3364 "Audio Definition Model Ver. 1.0", 2014] and proprietary standards such as Dolby Atmos [SMPTE TC-25CSS10 WG on, Interoperable Immersive Sound Systems for Digital Cinema", 2014] and DTS-MDA [ETSI document TS 103 223, "The Multi-Dimensional Audio (MDA) Content Creation Format Specification with Extensions for Consumer Environments", 2014].

The audio scene data may include audio data specifying a number of different audio objects for various audio sources in the scene. Some of these audio objects may be diffuse or general sounds that are not associated with any specific positions. For example, one or more audio objects may be ambient or background audio objects that represent background or ambient sounds. However, other audio objects may be associated with specific sound sources corresponding to specific positions in the sound stage. Accordingly, the audiovisual signal may also comprise position data which provides indications of desired positions for specific audio objects, i.e. it may include target position data for the audio objects.

In some scenarios, one or more audio objects may be associated with specific image objects. For example, an audio object may correspond to speech from a human in the image. This audio object may thus be associated with an image object corresponding to the human, or more specifically (e.g. for close ups) the mouth of the human. The audiovisual signal may in such an example comprise audio data that describes the speech and position data that indicates the position of the corresponding image object in the 3D image (i.e. the speaker (or mouth of the speaker)).

For other audio objects, the association to the three dimensional image may not be an association to a specific image object but may relate more indirectly to the scene represented by the 3D image. For example, the audio may originate from a source that is not visible in the rendered image (e.g. due to occlusion, distance or size).

The audio objects are thus typically not audio channel components provided for a specific predetermined or reference position but rather typically correspond to individual sound sources in the scene. In particular, one or more of the audio objects may directly be related to one image object in the 3D image (e.g. a speech audio object may be associated with an image object representing the speaker). The position data for a given audio object may be indicative of the position in the scene of the sound source represented by the audio object.

It will be appreciated that position data need not be included for all audio objects. In particular, some audio objects may not correspond to sound sources that have specific positions, but rather may have diffuse or spread source positions. For example, some audio objects may correspond to ambient or background sound which is not intended to be rendered from specific positions.

Although the described approach may be particularly advantageous when used with audio scene data comprising audio objects, it will be appreciated that the audio data may be provided in other ways in other embodiments. For example, the audio scene data may provide data for a plurality of spatial audio channels, such as for example it may provide a conventional surround sound audio signal.

The audio receiver 101 may in such embodiments be arranged to extract audio components, e.g. using Principal Component Analysis (PCA) or another suitable audio extraction approach. Such techniques may also provide an estimated position for the extracted audio components. The resulting audio components and position information may then be processed as described for the audio objects.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An element comprising: A spatial audio processing apparatus comprising:
a receiver,
wherein the receiver is arranged to receive audio scene data, the audio scene data describing an audio scene,
wherein the audio scene data comprises audio data,
wherein the audio data describes spatial audio components and position data, the position data describing positions in the audio scene for at least some of the spatial audio components;
a distance unit, wherein the distance unit is arranged to provide a variable focus distance, wherein the variable focus distance is indicative of a distance from a reference position in the audio scene;
an adapter, wherein the adaptor is arranged to adapt a perceptual emphasis property of at least a first spatial audio component of the spatial audio components relative to at least one other spatial audio component of the audio scene in response to a difference measure reflecting a difference between the variable focus distance and a distance in the audio scene from the reference position to a position of the first spatial audio component;
an audio renderer,
wherein the audio renderer is arranged to render the spatial audio components,
wherein the rendering is in response to the position data,
wherein the rendering of the first spatial audio component is subsequent to the adapting of the perceptual emphasis property.

2. The spatial audio processing apparatus of claim 1 wherein the adapter is arranged to determine a value of the perceptual emphasis property as a continuous function of the difference measure.

3. The spatial audio processing apparatus of claim 2 wherein the adapter is arranged to increase a gain for the first spatial audio component relative to the at least one other spatial audio component when the difference measure is indicative of a decreasing difference.

4. The spatial audio processing apparatus of claim 3 wherein the gain is determined as a function of the difference measure, the function being asymmetric with respect to distances from the reference position to the position of the first spatial audio component being smaller than the variable focus distance and to distances from the reference position to the position of the first spatial audio component being larger than the variable focus distance.

5. The spatial audio processing apparatus of claim 1, wherein the perceptual emphasis property is a frequency signal distribution for the first spatial audio component.

6. The spatial audio processing apparatus of claim 5, wherein the adapter is arranged to vary a frequency dependent filtering of the at least one other spatial audio component in response to the difference measure.

7. The spatial audio processing apparatus of claim 1, wherein the perceptual emphasis property is a diffuseness property for the first spatial audio component.

8. The spatial audio processing apparatus of claim 7, wherein the adapter is arranged to decrease a degree of diffuseness for the first spatial audio component relative to the at least one other spatial audio component of the audio scene when the difference measure is being indicative of a decreasing difference.

9. The spatial audio processing apparatus of claim 1, wherein the difference measure is dependent on a direction from the reference to the position of the first spatial audio component.

10. The spatial audio processing apparatus of claim 1, wherein the audio scene data comprises audio objects representing at least some of the spatial audio components.

11. The spatial audio processing apparatus of claim 1, wherein the distance unit is arranged to determine the variable focus distance in response to at least one of a listener head tracking and the listener eye tracking.

12. The spatial audio processing apparatus of claim 1, wherein the adapter is arranged to adapt the perceptual emphasis property without changing an Interaural Time Difference for the first spatial audio component.

13. The spatial audio processing apparatus of claim 1, wherein the adapter is arranged to adapt the perceptual emphasis property to reduce an emphasis of the first spatial audio component when there is an increasing difference measure for the variable focus distance being larger than the distance from the reference position to the position of the first spatial audio component.

14. A method of spatial audio processing comprising:
receiving audio scene data, the audio scene data describing an audio scene, wherein the audio scene data comprises audio data, wherein the audio data describes spatial audio components and position data describing positions in the audio scene for at least some of the spatial audio component;
providing a variable focus distance, wherein the variable focus distance is indicative of a distance from a reference position in the audio scene;
adapting a perceptual emphasis property of at least a first spatial audio component of the spatial audio components relative to at least one other spatial audio component of the audio scene in response to a difference measure, wherein the distance measure reflects a difference between the variable focus distance and a distance in the audio scene from the reference position to a position of the first spatial audio component; and
subsequent to the adapting of the perceptual emphasis property, rendering the spatial audio components including the first spatial audio component, the rendering being in response to the position data.

15. A computer program product, that is not a transitory propagating signal or wave, comprising computer program code adapted to perform all the steps of claim 14 when said program is run on a computer.

* * * * *